United States Patent [19]

Stream

[11] 4,153,438

[45] May 8, 1979

[54] METHOD AND APPARATUS FOR CONTROLLING THE VISCOSITY OF GLASS STREAMS

[75] Inventor: Ralph M. Stream, Newark, Ohio

[73] Assignee: Owens-Corning Fiberglas Corporation, Toledo, Ohio

[21] Appl. No.: 511,541

[22] Filed: Oct. 3, 1974

[51] Int. Cl.² .......................................... C03B 37/02
[52] U.S. Cl. ............................................ 65/2; 65/12; 65/356
[58] Field of Search ................ 65/2, 12, 356; 165/105

[56] References Cited
U.S. PATENT DOCUMENTS 3,644,110  2/1972  Sendt .................................. 65/356 X
3,708,271  1/1973  Loewenstein et al. ................... 65/12

Primary Examiner—Arthur D. Kellogg
Attorney, Agent, or Firm—Ronald C. Hudgens; Harry O. Ernsberger; Kenneth H. Wetmore

[57] ABSTRACT

The disclosure embraces a method of and apparatus for transferring heat from streams of glass flowing from a feeder through the use of a closed hollow heat exchanger unit or instrumentality containing a working fluid for rapidly absorbing heat from intensely hot glass streams to raise the viscosity of the glass of the streams to enable attenuation of the streams to fibers and thereby attain increased throughput of glass and higher production of fibers.

16 Claims, 8 Drawing Figures

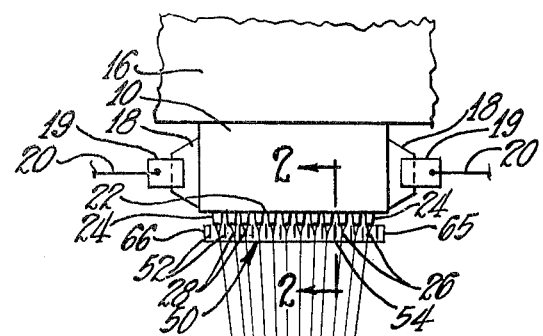
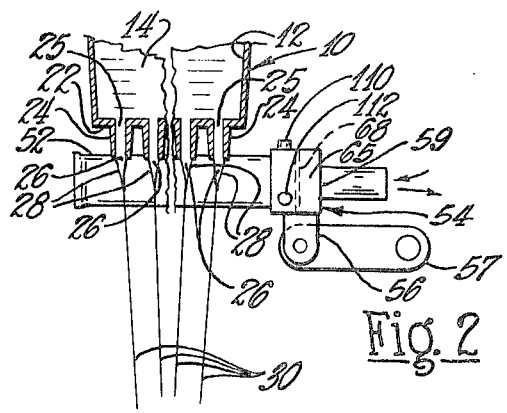
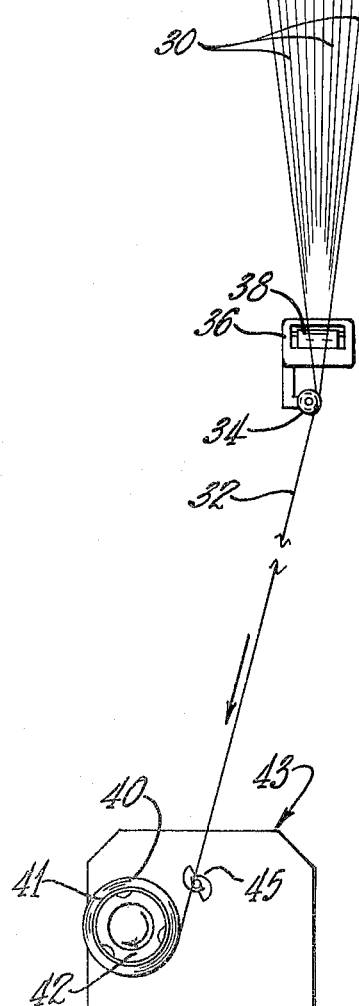
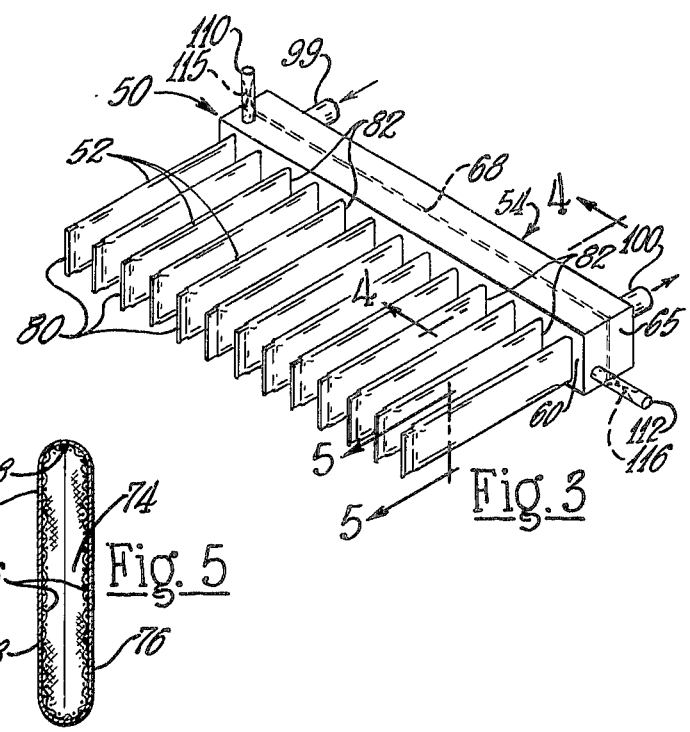
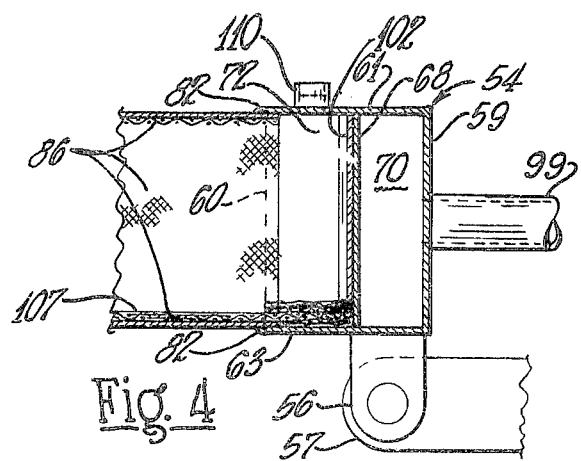
Fig. 1
Fig. 2
Fig. 3
Fig. 4
Fig. 5

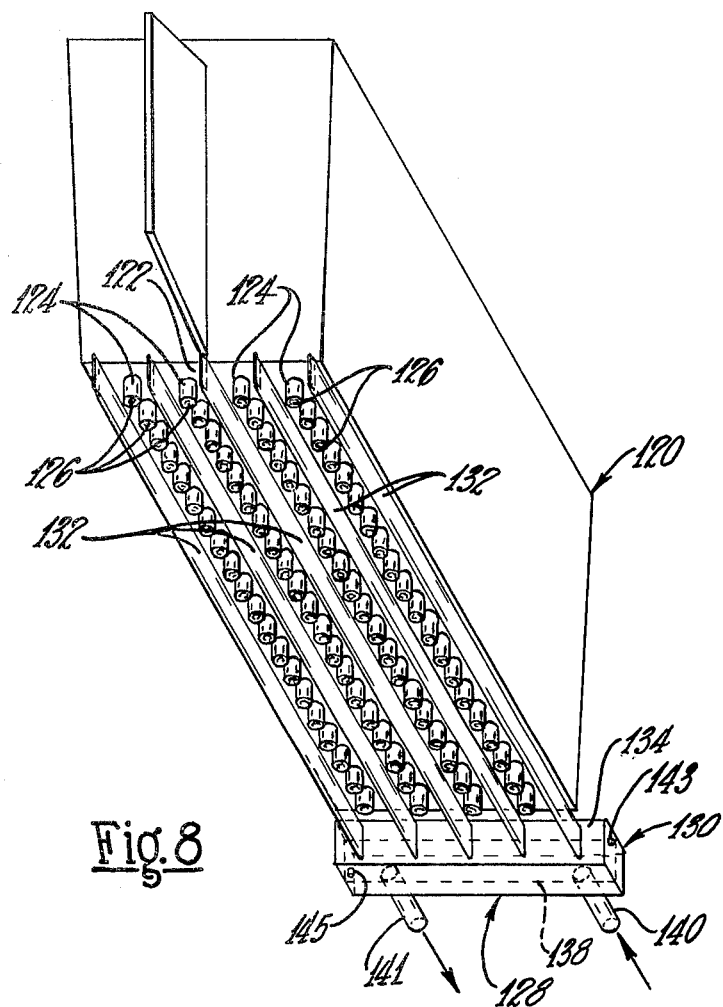

METHOD AND APPARATUS FOR CONTROLLING THE VISCOSITY OF GLASS STREAMS

The invention relates to processing glass and more especially to improvements in conditioning streams of glass of very high temperature to a viscosity whereby the streams may be attenuated to fibers or filaments at high rates of attenuation.

It has been a practice to flow streams of heat-softened glass from orifices in a feeder and attenuating the streams to fibers or filaments by means such as winding a group or strand of the fibers or filaments into a package or by engaging the group or strand of fibers or filaments with a rotating pull roll, the action of winding the strand into a package or advancing the strand by a pull roll attenuating the streams to continuous glass fibers or filaments. Strands of the attenuated fibers or filaments thus produced are processed into yarns, cords, roving, fibrous mats or other products.

Usually several stream feeders are spaced along a forehearth of a glass melting and refining furnace, each feeder receiving heat-softened glass from the forehearth. Another method involves remelting marbles or pieces of prerefined glass in the stream feeder. In either method, the bushing or stream feeder is electrically heated to maintain the heat-softened glass in a condition for flowing streams of the glass from the feeder. The stream flow orifices are preferably formed in projections or tips depending from the floor of the stream feeder.

The regions of the streams of glass at the projections are of cone-like configurations from which the fibers are drawn. The cohesive forces which transmit the attenuating forces from the fibers to the cones of glass are closely related to the viscosity of the glass of the streams and surface tension of the glass is instrumental in configurating the streams into conical shape. Where the glass is at a very high temperature and hence low viscosity, the glass may not be attenuable.

It is therefore imperative that the glass of the cones be cooled or reduced in temperature to a viscosity at which the glass may be successfully attenuated to fibers. At the more fluid end of the viscosity range, the highly-fluid low viscosity glass results in a pumping action within the cone hence promoting instability of the cones. If the viscosity of the glass is extremely low, surface tension acts to constrict the glass into discontinuous separate droplets. Thus, the range of viscosities for the glass of the cones is comparatively narrow within which successful fiberization of the streams can be accomplished.

In attenuating fibers from molten glass, the temperature and hence the viscosity of the glass in the stream feeder were limited by the rate at which the glass in the cones could be cooled to a fiberization viscosity. It has been conventional practice therefore to provide metal shields or fins adjacent the fiber-forming cones to conduct heat away from the cones of glass so that successful attenuation is accomplished. The metal shields are arranged in rows along a manifold through which water or other coolant is flowed to convey away the heat from the cones of glass which is transferred from the cones of glass to the shields. An arrangement for cooling the cones of glass to an attenuable condition is disclosed in U.S. Pat. No. to Russell 2,908,036.

The invention embraces a method of controlling the viscosity of streams of glass flowing from orifices in a stream feeder to enable the attenuation of the streams to fibers wherein heat from the streams is rapidly absorbed by a closed hollow heat exchanger or instrumentality containing a working fluid, and the asorbed heat conveyed away from the region of the streams to thereby increase the viscosity of the glass of the streams to a satisfactory attenuating condition.

The invention embraces a method of and apparatus for controlling the viscosity of streams of heat-softened material, such as glass, flowing from orifices in a stream feeder wherein heat from the streams is rapidly absorbed by an instrumentality containing a working fluid arranged whereby substantially the same amount of heat is absorbed from each of the streams so that the viscosity of each of the streams is increased substantially uniformly thereby promoting uniformity of viscosity of the streams which may be attenuated to fibers of substantially uniform size.

An object of the invention embraces a method of processing glass for attenuation to fibers wherein intensely hot glass of very low viscosity is flowed through orifices in a feeder whereby a greater throughput of glass per unit of time is attained, and heat rapidly absorbed from the streams by a heat exchanger or heat transferring instrumentality at a rate effective to increase the viscosity of the glass of the streams to an attenuable condition and thereby to attain increased production of attenuated fibers.

An object of the invention resides in a method of processing glass wherein streams of glass flow from orifices in a feeder and heat from the streams rapidly transferred to a sealed hollow body containing a working fluid for increasing the viscosity of the glass of the streams to enable the attenuation of the streams to fibers, and moving a cooling fluid in heat-transferring relation with the sealed hollow body for conveying away heat absorbed from the glass streams.

An object of the invention resides in a method of exercising control of the viscosity of streams of glass flowing from orifices in a stream feeder to enable the attenuation of the streams to fibers, the method involving the use of a closed hollow heat-absorbing unit containing a small amount of vaporizable liquid wherein heat absorbed from the glass streams by the unit vaporizes the liquid in one region of the unit and the vapor condensed in another region of the unit under the influence of a circulating fluid in heat-transferring relation with the unit.

An object of the invention resides in the provision of an arrangement in association with groups of streams of heat-softened glass flowing from orifices in a stream feeder including a closed or sealed heat-transfer or heat exchanger unit embodying a plurality of hollow heat-absorbing body sections in adjacent heat-transferring relation with the groups of glass streams, the heat-absorbing body sections being in sealed communication with a condensing body section, the unit containing a small amount of a vaporizable liquid which is vaporized by heat absorbed by the heat-absorbing body sections from the glass streams and the vapor condensed in the condensing body section to thereby increase the viscosity of the glass of the streams to enable attenuation of the streams to fibers.

Another object of the invention resides in an arrangement for increasing the viscosity of glass streams flowing from a stream feeder, the arrangement including a closed or sealed hollow body construction in heat-transferring relation with the glass streams, the body construction containing a small amount of vaporizable liquid which is vaporized in one region of the body construction by heat absorbed from the streams, and the vapor condensed in another region of the body construction, the condenser region being cooled by a moving fluid in heat-transferring relation with the condenser region of the body construction whereby the cycle of vaporization and condensation is continuous.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a schematic side elevational view of an arrangement embodying a form of the invention for the production of continuous glass fibers;

FIG. 2 is an enlarged sectional view taken substantially on the line 2—2 of FIG. 1 illustrating the heat exchanger unit in association with the glass stream feeder;

FIG. 3 is an isometric view illustrating the heat exchanger unit;

FIG. 4 is an enlarged fragmentary sectional view taken substantially on the line 4—4 of FIG. 3;

FIG. 5 is an enlarged view of a heat-absorbing body section of the heat exchanger unit, the view being taken substantially on the line 5—5 of FIG. 3;

FIG. 8 is an isometric view of a modification of heat exchanger unit in association with a glass stream feeder.

Figure 6:
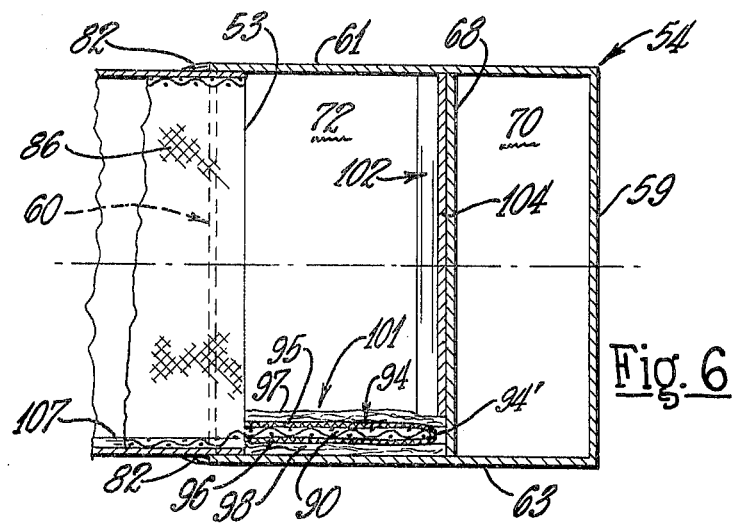
FIG. 6 is a greatly enlarged view of a portion of the construction shown in FIG. 4.

Referring to the drawings and initially to FIG. 1, there is illustrated a stream feeder or bushing 10 providing a chamber 12 containing molten glass 14, the feeder or bushing being attached to and receiving molten glass from the forehearth 16 of a glass furnace (not shown). The stream feeder or bushing 10 is provided at its ends with terminal lugs 18 to which are secured terminal clamps 19 for connection with current conductors or bus bars 20, the latter being supplied with electric current for maintaining the glass in the stream feeder 10 at comparatively high temperature and low viscosity.

The bushing or stream feeder 10, in lieu of receiving molten glass from a forehearth, may be supplied with preformed pieces or marbles of prerefined glass reduced to molten condition in the feeder 10 by the electric energy supplied to the feeder.

In the stream feeder 10 illustrated, the floor 22 of the feeder is fashioned with transverse rows of depending projections 24, each projection having a passage or orifice 25 through which flows a stream 26 of molten glass of very high temperature and low viscosity from the feeder.

Each glass stream, at or adjacent the region of its exit from the orifice or passage 25 is in the form of a cone 28. The glass of the cones is cooled through the herein described method and arrangement at a much faster or higher rate than has heretofore been possible with conventional fin shields. The method and arrangement of the invention includes a heat exchanger or heat transfer unit or instrumentality hereinafter described for increasing the viscosity of the glass of glass streams to a condition promoting successful attenuation of the streams or cones of glass to fibers or filaments 30.

The attenuated fibers or filaments 30 are converged into a linear group or strand 32 by a gathering shoe or member 34 preferably supported from a housing 36. The housing 36 provides a chamber or reservoir containing a sizing or coating material for the fibers. Disposed in the housing 36 and partially immersed in the sizing or coating material is an applicator member or roll 38 which may be a rotating roll or an endless belt immersed in the sizing or coating material, the fibers 30 engaging the applicator whereby a film of sizing or coating is transferred onto the fibers by wiping contact.

The strand 32 of fibers is wound into a package 40 on a thin-walled forming tube 41 telescoped onto a rotating mandrel 42 of a conventional winding machine 43, the mandrel 42 being rotated by a motor (not shown). During winding of the strand into a package, the strand is distributed lengthwise of the package by a rotatable and reciprocable traverse member 45 of conventional construction.

The heat exchanger or heat transfer unit or instrumentality 50 for absorbing and conveying heat away from the glass streams is particularly illustrated in FIGS. 2 through 7. The method and arrangement for rapidly absorbing heat from the glass streams function generally according to the principle of the heat pipe and absorb and convey away heat from the glass streams at a greatly increased rate over the known methods and means of cooling glass streams whereby highly fluid, low viscosity glass of the streams is rapidly conditioned to a higher viscosity suitable for attenuation of the streams to fibers or filaments and attain a substantial increase in the production of fibers or filaments.

The heat exchanger, heat transfer unit or instrumentality 50 is inclusive of a body or body construction comprising one or more heat-absorbing or vaporizing zones and a condensing zone or chamber containing a working fluid, and a cooling chamber accommodating a circulating fluid for maintaining a reduced temperature in the condensing zone, the circulating fluid conveying away heat absorbed from the glass streams. The body or body construction of the heat exchanger or heat transfer instrumentality comprises one or more tubular or hollow bodies, body sections or heat-absorbing components 52 providing a vaporizing zone or zones, the hollow body sections 52 being secured to a body member or body section 54.

The body, body section or component 54 is, in effect, a manifold which is separated by a partition into a condensing zone and a cooling fluid circulating zone. In the arrangement shown in FIGS. 1 through 3, the body section or manifold 54 extends lengthwise of the stream feeder 10. The hollow body sections 52 are spaced so as to accommodate a transverse row of glass streams 26 between each pair of body sections 52.

If desired, the body sections 52 may be spaced so as to accommodate two transverse rows of glass streams between each pair of body sections 52. As shown in FIG. 2, the body sections or heat-absorbing components 52 are preferably disposed adjacent the cone-shaped regions 28 of the glass streams 26 so as to absorb heat rapidly from the cone-shaped regions of the glass streams to increase the viscosity of the glass of the streams.

The body or manifold 54 is provided with a depending member 56 connected with a support member 57 which may be mounted in a conventional manner on adjacent frame structure (not shown). In the embodiment illustrated in FIGS. 1 and 3, there are thirteen heat-absorbing body sections 52 for absorbing heat from twelve transverse rows of glass streams 26, but it is to be understood that the heat transfer unit or instrumentality may be provided with a greater or lesser number of body sections 52 depending upon the number of transverse rows of glass streams flowing from orifices in the stream feeder.

The manifold or body component 54 is fashioned with side walls 59 and 60, an upper wall 61, a lower wall 63 and end walls 65 and 66. Extending lengthwise and interiorly of the body component or section 54 is a partition or wall 68 as particularly shown in FIG. 4, the wall separating the body component 54 into a circulating fluid receiving chamber 70 and a condensing zone or chamber 72.

Each of the heat-absorbing components or body sections 52 is of hollow or tubular construction, as shown in FIG. 5, the interior of each body section 52 constituting a vaporization chamber or zone 74. As shown in FIG. 5, each heat-absorbing section 52 is of generally flat rectangular cross section whereby the side walls 76 and 78 provide substantial planar areas for absorbing heat from the glass streams.

The heat-absorbing body sections 52 are fashioned as thin as practicable so that they may be disposed in close proximity to the rows of glass streams so as to effectively absorb heat from the streams. The body sections 52 may be fashioned of beryllium copper or other suitable metal which has a high heat transfer or absorption characteristic. The outer or distal end 80 of each of the heat-absorbing components or bodies 52 is closed or sealed as illustrated in FIG. 3.

The opposite ends of each of the heat-absorbing body sections or components 52 are open in communication with the condensing zone or chamber 72. The ends of the walls defining the open ends of the body sections 52 are brazed or fused to the wall 60 as indicated at 82 in FIGS. 3, 4, 6 and 7 forming a sealed or closed juncture of each heat-absorbing body section 52 with the wall. Thus, the assemblage of heat-absorbing body sections 52 and the chamber 72 provide a closed or sealed unit or heat-transferring body or instrumentality.

As previously mentioned, the heat absorption assemblage functions on the heat pipe principle wherein a working fluid is vaporized in a heat-absorption zone, the vapor condensed in a condensing zone and the condensate continuously returned to the heat-absorption zone. It has been found that within the working temperature ranges encountered in absorbing and transferring heat from the glass streams that water has been a satisfactory working fluid but it is to be understood that other vaporizable working fluids may be used to function as heat transfer mediums which have vaporization and condensation characteristics suitable for functioning in the range of temperatures of glass streams.

The heat-transferring function of the working fluid, such as water, is a continuous action or cycle wherein the liquid phase becomes a vapor phase in the heat-absorbing body or body sections and the vapor phase is reduced to the liquid phase in the condensing zone or chamber. The working fluid in the liquid phase is moved, flowed or transferred from the condensing zone to the vaporizing zone through the use of means providing capillary action.

With particular reference to FIGS. 4 through 7, the interior of each of the hollow body sections 52 is provided with a lining or layer 86 of fine mesh material, such as a fine mesh copper screen, having 100 meshes to the linear inch. As illustrated in FIG. 5, the copper screen layer 86 is of U-shaped configuration, the upper ends of the U-shaped configuration being in abutting or adjacent relation as indicated at 88. The fine mesh screen 86 is in contiguous contacting engagement with the interior wall surface of the heat-absorbing body 52.

Figure 7:
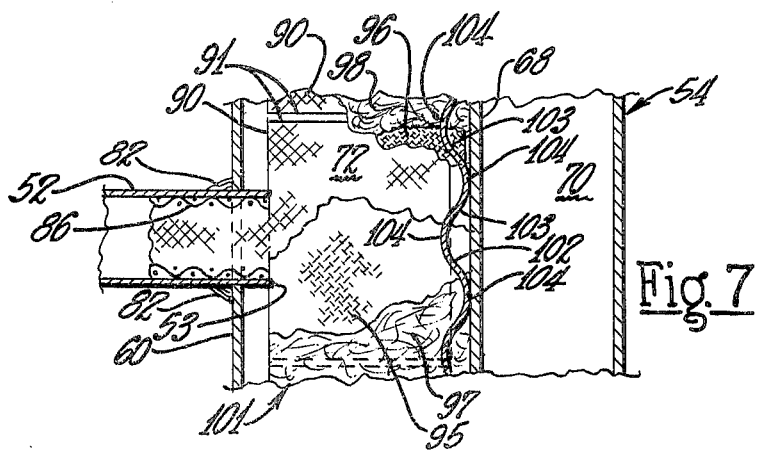
FIG. 7 is a sectional view taken substantially on the line 7—7 of FIG. 6 with certain portions broken away.

The screen 86, at the inner end 53 of a body section 52, is slitted or severed transversely and portions 90 are unfolded from the U-shaped configuration and extend in opposite directions from the body section as particularly shown in FIG. 7. The ends 91 of the flattened or planar portions 90 of the screen are in adjacent relation as shown in FIG. 7.

Embracing the flattened or planar portions 90 of all of the screens is a U-shaped member 94 of copper braid, the parallel walls 95 and 96 of the copper braid enclosing the planar portions 90 of the screens 86, simulating a sandwich configuration as illustrated in FIG. 6, the walls of the U-shaped braid member 94 being joined by the bight portion 94'.

Disposed in contiguous engaging relation with the upper wall 95 of the U-shaped braid 94 is a layer 97 of copper felt, and disposed between the lower wall 96 of the braid 94 and the adjacent portion of the lower wall 63 of the body section 54 is a layer 98 of copper felt, the layer 98 being in contiguous contacting engagement with the adjacent portion of the wall 63.

The assemblage shown in FIGS. 6 and 7 of the tabs or planar portions 90 of the screen 86, the U-shaped copper braid 94 and the layers 97 and 98 of copper felt provides a mass, mat or body 101 having the characteristic of facilitating flow of liquid by capillary action so as to foster or promote distribution of liquid from the mass or mat 101 to the fine mesh screen 86 which, in turn, distributes the liquid throughout the entire interior surface areas of the heat transfer bodies or body sections 52.

The liquid held by capillary action in each of the screens 86 is vaporized or volatilized by heat absorbed from the glass streams 26, the vapor moving toward and into the condensing zone or chamber 72. The manifold chamber 70 is adapted to accommodate circulating cooling fluid, such as water. One end of the chamber 70 is provided with an inlet pipe 99 connected with a supply (not shown) of cooling water. The other end region of the chamber 70 is provided with an outlet pipe 100.

Cooling fluid, such as water, is circulated through the manifold chamber 70 so as to convey away heat absorbed from the glass streams and the bodies or body sections 52. The cooling fluid moving through the chamber or passage 70 maintains the partition or wall 68 at a reduced or cooled temperature substantially below the temperature of the vaporized working fluid in the bodies 52 and the chamber 72.

Disposed adjacent the wall or partition 68 is a corrugated porous condenser wick 102 fashioned of sintered copper powder. The wick 102 is of corrugated configuration with the corrugations 103 extending in a vertical direction as shown in FIG. 6 in parallelism with the vertical wall or partition 68 in the body member or manifold 54 and hence parallel with the glass streams flowing from the stream feeder. The alternate ridges or peaks 104 of the corrugations 103 of the sintered copper wick are bonded or sintered to the partition or wall 68.

The corrugated porous wick 102, having alternate corrugations sintered or bonded to the cooled partition or wall 68, promotes a reduced temperature of the porous wick 102. The corrugated wick 102 provides cooled surface areas in addition to the surface area of the wall 68 of reduced temperatures to facilitate comparatively rapid condensation of the vapor on the reduced temperature surfaces of the wall 68 and the porous wick 102.

The liquid or condensate collecting on the surface of the wall 68 and the surfaces of the wick 102 flows downwardly into the mass or mat 101 comprising copper screen, copper braid and copper felt on the floor 63 of the condensing chamber 72. A comparatively small amount of water 107 as a working fluid is contained in the sealed or closed heat transfer unit or assembly comprising the condensing zone 72 and the hollow heat-absorbing bodies 52.

In fabricating the heat exchanger or heat transfer unit 50, it is essential to first establish a high vacuum in the sealed or closed heat transfer unit and thereafter the working fluid, such as water, is introduced into the unit. For this purpose, tubular members or pipes 110 and 112 are connected with the chamber 72 as shown in FIG. 3. The tube 110 is adapted to be connected with a vacuum producing means or vacuum pump (not shown).

The tube 112 is connected with a supply of working fluid, such as water, a valve means (not shown) being associated with the pipe 12, which valve means may be closed during the establishment of a vacuum or reduced pressure condition in the heat transfer unit 50. With the valve means associated with tube 112 in closed position, a vacuum pump or other vacuum producing means connected with the tube or pipe 110 is actuated and operated for a sufficient length of time so that a vacuum exceeding ninety percent and preferably about ninety-five percent is established in the sealed heat transfer unit 50.

The tube 110 is then closed or pinched shut as indicated in broken lines at 115. The valve associated with the pipe 112 is then opened and a small amount of working fluid, such as water, is introduced into the sealed heat transfer unit 50. After the desired amount of water is admitted into the heat transfer unit, the tube 112 is closed or pinched shut as indicated in broken lines at 116. The tubes may then be severed at a short distance away from the pinched regions 115 and 116, the working fluid contained in the sealed heat transfer unit being under high vacuum.

In the use of the heat transfer unit with a stream feeder, the unit is mounted in a manner shown in FIGS. 1 and 2 with the manifold or body 54 substantially parallel with and lengthwise of the stream feeder 10 with the heat transfer body sections or fins 52 extending horizontally and transversely of the feeder and disposed respectively adjacent and between the transverse rows of glass streams 26. Heat absorbed from the glass streams 26 by the body sections 52 vaporizes the liquid, such as water, held in the fine mesh screen 86 by capillary action throughout the vaporizing chamber 74 of each of the body sections 52.

The vapor flows by vapor pressure toward the condenser section or zone 72 into contact with the reduced temperature or cooled surfaces of the wall 68 and the sintered copper wick 102, the vapor condensing on the surfaces. The liquid or condensate flows downwardly by gravity into the components constituting the capillary mass or mat 101, the condensate in the mass moving by capillary action along the portion of the screen 86 at the bottom regions of the body sections 52.

The liquid or condensate flows or is distributed throughout the screen 86 in each of the body sections 52 by capillary action. The liquid held by the screen is vaporized by heat absorbed from the glass streams and the vapor returned to the condensing chamber 72 where the vapor is condensed as hereinbefore described.

Thus, the heat absorption and transfer cycle is continuous and such arrangement transfers heat away from the glass streams at a much faster rate than is possible with conventional fin shields of the copper bar type. As the heat transfer rate is much more rapid than prior methods of transferring heat away from the glass streams, the glass 14 in the feeder may be heated to a higher temperature so that the glass of the streams is at a very low viscosity and hence the throughput or rate of flow of glass through the orifices is much higher than in conventional stream feeders.

By reason of the increased rate of heat transfer through the use of the method and arrangement herein described, the glass streams of low viscosity may be very rapidly cooled to a viscosity at which the glass of the streams may be successfully attenuated to fine fibers or filaments through the arrangement illustrated in FIG. 1 or other suitable attenuating means. Thus, as the throughput of glass through the orifices of the feeder is increased, the increased flow of glass of the streams is attenuated so that a substantial increase of attenuated filaments in a unit of time is greatly increased. Such method and arrangement promote increased production of attenuated filaments much more economical than has heretofore been possible.

The following is a description of a working example of the heat transfer unit or instrumentality of the invention. The manifold 54 is preferably in cross section about three fourths of an inch square, the manifold being divided by the vertical wall 68 into the condensing chamber 72 and the cooling water circulating chamber or passage 70. Each of the heat absorbing bodies 52 may be about two and one-half inches in length when used with a transverse row of five glass streams flowing from a feeder, the length of each heat transfer body section 52 being dependent upon the number of streams in a transverse row.

Each body section 52 is about five-eighths of an inch in height and of an exterior width of about one-tenth of an inch. The bodies 52 are spaced about 0.350 of an inch between centers where one transverse row of glass streams is disposed between adjacent bodies 52. The hollow body sections 52 are preferably formed of beryllium copper and have a wall thickness of about 0.020 inches. With an assemblage of twenty heat transfer body sections 52 having the above-mentioned dimensions, the amount of water in the assemblage, which includes the hollow body sections 52 and the condenser chamber 72, is eighteen grams as the working fluid.

Cooling water or other fluid is circulated through the manifold chamber 70 at a rate at which it is desired to transfer heat away from the wall 68 and the corrugated wick 102. By regulating the rate of flow or temperature of the cooling fluid through the chamber 70, the rate of condensation of the vapor in the chamber 72 may be varied and thereby vary the rapidity of the cycle of the vaporization — condensing phases of the heat transfer method or system and hence vary to a limited extent the rate of heat absorption and the viscosity of the glass streams.

An advantage of the method and arrangement of the invention is that heat is absorbed from the glass streams by the heat transfer bodies 52 substantially throughout the entire area of the surface of each of the bodies. This method of heat transfer promotes the formation of streams of uniform viscosity resulting in attenuated filaments of substantially uniform size.

FIG. 8 illustrates a modified arrangement of heat transfer unit or instrumentality associated with a stream feeder. In the arrangement shown in FIG. 8, the stream feeder 120 has a floor 122 provided with lengthwise disposed rows of depending projections 124, each having an orifice or passage 126 through which flows a stream of heat-softened glass contained within the feeder 120. Associated with the stream feeder 120 is a heat transfer unit or instrumentality 128 which is inclusive of a body or manifold 130 disposed adjacent one end region of the feeder 120 and extending transversely of the feeder.

Disposed lengthwise of the feeder are hollow heat transfer bodies or body sections 132, there being a body section 132 between each of the lengthwise rows of depending projections 124 and a body section 132 exteriorly of each of the outside rows of depending projections 124. The hollow heat transfer bodies or body sections 132 are connected to a side wall 134 of the body 130 in the same manner as the hollow bodies 52 are connected with the wall 60 as shown in FIGS. 6 and 7.

The transversely extending body or manifold 130 is of substantially square cross section and is provided with a lengthwise-extending vertical partition 138 dividing the hollow manifold 130 into a circulating fluid cooling chamber or passage and a condensing chamber in the manner of the arrangement shown in FIGS. 6 and 7. The cooling chamber is provided with an inlet pipe 140 and an outlet pipe 141, the pipe 140 being connected with a supply of cooling fluid, such as water, which is circulated through the cooling chamber to cool the partition or wall 138 in the same manner as the wall 68 is cooled by water circulating through the chamber 70 shown in FIGS. 6 and 7 and hereinbefore described.

The hollow heat transfer units or bodies 132 extend lengthwise substantially full length of the feeder 120 and each of the hollow bodies 132 is provided with a fine mesh screen of the character illustrated at 52 in FIG. 5. The condensing zone or chamber in the body 130 is provided with the mass of capillary material of the same character as illustrated in FIGS. 6 and 7 and hereinbefore described. Also sintered to the wall or partition 138 in the condensing chamber is a corrugated sintered copper wick of the same character as illustrated at 102 in FIGS. 6 and 7.

In the fabrication of the heat-transfer unit comprising the hollow bodies 132 and the condenser chamber, a vacuum pump is connected with the chamber by a tube 143 while a valve (not shown) for a water inlet tube 145 is closed and a high vacuum established in the interior of the heat transfer unit. After the vacuum is established, the tube 143 is pinched shut or closed in the manner of the tube 110 shown in FIG. 3. A small amount of water is then introduced into the unit through the tube 145 and the tube pinched shut in the manner of closing the tube 112 in FIG. 3, and hereinbefore described.

The hollow heat absorbing or transfer bodies 132, extending longitudinally of the stream feeder 120, absorb heat from the streams of glass flowing through the orifices 126. The cycle of vaporizing the water in the heat absorbing bodies and condensing the vapor in the condensing chamber in the manifold or body 130 is the same as the cycle of heat absorption and transfer hereinbefore described in connection with the form of the invention illustrated in FIGS. 1 through 7.

As the heat absorbed from the glass streams by the heat transfer bodies 132 is substantially uniform throughout the entire surface areas of the bodies 132 through vaporization of the water or working fluid in the unit, heat is absorbed substantially uniformly from all of the glass streams so that they are cooled to the same viscosity in condition for attenuation.

It is apparent that, within the scope of the invention, modifications and different arrangements may be made other than as herein disclosed, and the present disclosure is illustrative merely, the invention comprehending all variations thereof.

I claim:

1. The method of processing glass including flowing streams of glass from orifices in a feeder containing heat-softened glass, establishing environmental control at the regions of the streams of glass adjacent the stream flow orifices including a hollow imperforate body containing a small amount of vaporizable liquid and providing a vaporizing zone in heat-transferring relation with the glass streams, vaporizing the liquid in the vaporizing zone by heat absorbed from the glass streams, and condensing the vapor in a condensing zone in communication with the vaporizing zone.

2. The method according to claim 1 including conveying away heat from the condensing zone.

3. The method according to claim 1 including returning the condensate along the interior surface of the hollow body by capillary action to the vaporizing zone.

4. The method according to claim 1 including circulating cooling fluid in heat-transferring relation with the condensing zone for maintaining the temperature of the condensing zone below the vaporizing temperature of the liquid.

5. The method of processing glass including flowing streams of glass from orifices in a feeder containing heat-softened glass, establishing environmental control of the viscosity of the glass of the streams adjacent the stream flow orifices, the environmental control including a hollow imperforate instrumentality containing a small amount of working fluid and providing a vaporizing zone in heat-transferring relation with the glass streams and a condensing zone, vaporizing the working fluid in the vaporizing zone by heat absorbed from the glass streams, and condensing the vapor in the condensing zone.

6. Apparatus for processing glass including a feeder provided with orifices through which flow streams of heat-softened glass contained in the feeder, environmental control means for increasing the viscosity of the glass of the streams adjacent the stream flow orifices, said environmental control means including a hollow imperforate body means disposed adjacent the feeder providing a vaporizing zone and a condensing zone, said body means containing a small amount of working fluid adapted to be vaporized in the vaporizing zone by heat absorbed from the glass streams and the vapor condensed in the condensing zone, and capillary material in said body means for transferring condensate from the condensing zone to the vaporizing zone by capillary action.

7. Apparatus for processing glass including a feeder provided with orifices through which flow streams of heat-softened glass contained in the feeder, environmental control means for increasing the viscosity of the glass of the streams adjacent the stream flow orifices, said environmental control means including an instrumentality having a plurality of hollow imperforate body sections providing vaporizing zones and a condensing chamber, said body sections being disposed in heat-absorbing relation with the glass streams, said instrumentality containing a small amount of water adapted to be vaporized in the vaporizing zones provided by the body sections by heat absorbed from the glass streams and the vapor condensed in the condensing chamber, and capillary material in the body sections and the condensing chamber for transferring condensate by capillary action from the condensing chamber to the vaporizing zones in the body sections.

8. Apparatus for processing glass including a feeder, said feeder having a floor section provided with orifices through which flow streams of heat-softened glass from the feeder, environmental control means associated with the feeder for conveying away heat from the glass streams to increase the viscosity of the glass of the streams, said environmental control means including a manifold member disposed adjacent and out of contact with the feeder, a lengthwise arranged wall interiorly of the manifold member and forming with the manifold member a passage adapted to accommodate a circulating cooling fluid and a condensing chamber independent of the passage, a plurality of tubular heat exchanger members having their outer ends closed and their inner open ends in communication with the condensing chamber, said tubular members and condensing chamber being normally under substantial reduced pressure, said tubular members and condensing chamber containing a comparatively small amount of liquid adapted to be vaporized by heat absorbed from the glass streams, and means disposed adjacent the interior surfaces of the tubular heat exchanger members for distributing the liquid by capillary action in heat-transferring relation with the interior surfaces of the tubular heat exchanger members.

9. Apparatus for processing glass including a feeder having a floor section provided with orifices through which flow streams of heat-softened glass contained in the feeder, environmental control means for increasing the viscosity of the glass of the streams, said environmental control means including a manifold member disposed adjacent the feeder, a partition extending lengthwise in said manifold member and defining a passage accommodating circulating cooling fluid and a condensing chamber independent of the passage, a plurality of tubular heat exchanger members of substantially rectangular cross section disposed in heat-transferring relation with the streams of glass flowing from the feeder, said tubular heat exchanger members having their outer ends closed and their inner open ends in communication with the condensing chamber, said condensing chamber and tubular heat exchanger members being normally under reduced pressure and containing a comparatively small amount of vaporizable liquid, and mesh material adjacent the interior wall surfaces of the heat exchanger members for distributing the vaporizable liquid over the interior walls whereby heat from the glass streams vaporizes the liquid and the vapor condensed in the condensing chamber at reduced temperature effected by the circulating cooling fluid.

10. A fiber glass bushing unit comprising in combination a container for the reception of molten glass, a plurality of orifices on the bottom of said container arranged in parallel rows, a plurality of plate-like fin members positioned between the rows of orifices by but below and out of contact with said container, said plate-like fins being mounted at one end in a header member, means to pass the fluid coolant through said header member, each of said plate members having a wick material affixed to the interior surfaces of said plate member and having a central cavity located therein, a vaporizable liquid on said wick capable of being vaporized from the surface of said wick and recondensed on said wick during operation.

11. A method of cooling glass fibers being drawn from a molten glass source from a plurality of glass orifices located on the bottom of said glass source, removing heat from said fibers by positioning a plurality of plate-like heat exchange members between said fibers to thereby absorb the radiant heat from said fibers on the surface of said plate-like members continuously, maintaining the surface of the plate-like members receptive to heat absorption by vaporizing a volatile fluid on the interior surface of said plate-like members continuously from the surface of a wick contained therein and removing heat continuously from said plate-like members by indirect heat exchange with the mounting means for said plate-like members to thereby condense said volatile fluid in said plate-like members and thereby return it to the wick for further vaporization.

12. A fiber glass bushing unit comprising in combination a container for the reception of molten glass, a plurality of orifices on the bottom of said container arranged in parallel rows, a plurality of members positioned between the rows of orifices by but below and out of contact with said container, said members being mounted at one end at a header, means to pass the fluid coolant through said header, each of said members having a wick material adjacent the interior surfaces of said member and having a central cavity located therein, a vaporizable liquid on said wick capable of being vaporized from the surface of said wick and recondensed on said wick during operation.

13. A method of cooling glass fibers being drawn from a molten glass source from a plurality of glass orifices located on the bottom of said glass source, removing heat from said fibers by positioning a plurality of heat exchange members between said fibers to thereby absorb the radiant heat from said fibers on the surface of said members continuously, maintaining the surface of members receptive to heat absorption by vaporizing a volatile fluid on the interior surface of said members continuously from the surface of a wick contained therein and removing heat continuously from said members by indirect heat exchange with the mounting means for said members to thereby condense said volatile fluid in said members and thereby return it to the wick for further vaporization.

14. A glass fiber forming unit comprising in combination a container for the reception of molten glass, a plurality of orifices on the bottom of said container arranged in rows, and a pluralty of elongate members comprising a closed heat pipe having vaporizer and condenser sections with a portion of said heat pipe extending between the rows of orifices, said elongate members being mounted at the condenser section thereof on a fluid cooled manifold member.

15. The glass fiber forming unit of claim 14 wherein said elongate members comprising a closed heat pipe are plate-like in cross section with the condenser portion thereof adjacent said manifold and the vaporizer portion thereof positioned away from said manifold.

16. A glass fiber forming unit comprising in combination a container for the reception of molten glass, a plurality of orifices on the bottom of said container arranged in rows, and at least one elongate member comprising a closed heat pipe having vaporizer and condenser sections positioned in heat exchange relation with said rows of orifices, said elongate member being mounted at the condenser section thereof on a fluid cooled manifold member.

* * * * *